(12) United States Patent
Longo et al.

(10) Patent No.: US 11,738,488 B2
(45) Date of Patent: Aug. 29, 2023

(54) METHOD OF MAKING SURF FIN INCLUDING INJECTION MOLDED PRE-IMPREGNATED COMPOSITE FIBER MATRIX INSERTS

(71) Applicant: Todos Santos Surf, Inc., Huntington Beach, CA (US)

(72) Inventors: Vince Longo, Huntington Beach, CA (US); Tony Longo, Laguna Niguel, CA (US); John Griffin, Huntington Beach, CA (US)

(73) Assignee: TODOS SANTOS SURF, INC., Huntington Beach, CA (US)

( * ) Notice: Subject to any disclaimer, the term of this patent is extended or adjusted under 35 U.S.C. 154(b) by 840 days.

(21) Appl. No.: 15/264,301

(22) Filed: Sep. 13, 2016

(65) Prior Publication Data

US 2017/0001347 A1    Jan. 5, 2017

Related U.S. Application Data

(62) Division of application No. 14/175,949, filed on Feb. 7, 2014, now Pat. No. 9,463,588.

(51) Int. Cl.
*B29C 45/14* (2006.01)
*B32B 5/18* (2006.01)
(Continued)

(52) U.S. Cl.
CPC .... *B29C 45/14786* (2013.01); *B29C 44/1233* (2013.01); *B29C 45/14467* (2013.01);
(Continued)

(58) Field of Classification Search
None
See application file for complete search history.

(56) References Cited

U.S. PATENT DOCUMENTS

| 4,798,549 A | 1/1989 | Hirsch |
| 4,804,347 A | 2/1989 | Ross |
(Continued)

FOREIGN PATENT DOCUMENTS

| DE | 3701953 | 8/1988 |
| DE | 102007036660 | 2/2009 |
(Continued)

OTHER PUBLICATIONS

European Patent Office, Communication—Extended European Search Report, dated Sep. 29, 2017, 12 pages, Munich, Germany.
(Continued)

*Primary Examiner* — Mohammad M Ameen
(74) *Attorney, Agent, or Firm* — STETINA BRUNDA GARRED& BRUCKER

(57) ABSTRACT

A method of forming a fin configured for use with a water sports board. The method includes providing a mold having a mold cavity and first and second insert pre-preg sheets each including structural strands respectively bonded by first and second resin materials. The method further includes placing the insert pre-preg sheets within the mold cavity. The method further includes injecting a third resin material under pressure into the mold cavity between the first insert pre-preg sheet and the second insert pre-preg sheet to urge the first insert pre-preg sheet and the second insert pre-preg sheet away from each other and towards respective ones of the pair of mold cavity faces, and dispose the third resin material between the first insert pre-preg sheet and the second insert pre-preg sheet to space at least a portion of the first insert pre-preg sheet from the second insert pre-preg sheet.

6 Claims, 5 Drawing Sheets

(51) Int. Cl.
  B32B 27/06 (2006.01)
  B32B 27/12 (2006.01)
  B32B 3/06 (2006.01)
  B32B 3/26 (2006.01)
  B63B 32/62 (2020.01)
  B29C 44/12 (2006.01)
  B29C 45/72 (2006.01)
  B29L 31/52 (2006.01)
  B29C 45/17 (2006.01)
  B29C 45/16 (2006.01)
  B29K 105/04 (2006.01)
  B29K 105/08 (2006.01)

(52) U.S. Cl.
  CPC .. *B29C 45/14491* (2013.01); *B29C 45/14508* (2013.01); *B29C 45/7207* (2013.01); *B32B 3/06* (2013.01); *B32B 3/266* (2013.01); *B32B 5/18* (2013.01); *B32B 27/065* (2013.01); *B32B 27/12* (2013.01); *B63B 32/62* (2020.02); B29C 45/1671 (2013.01); B29C 45/1704 (2013.01); B29C 2045/1454 (2013.01); B29K 2105/04 (2013.01); B29K 2105/0872 (2013.01); B29L 2031/5272 (2013.01); B32B 2260/021 (2013.01); B32B 2260/046 (2013.01)

(56) References Cited

U.S. PATENT DOCUMENTS

| | | | |
|---|---|---|---|
| 5,032,096 A * | 7/1991 | Scott | B29C 44/146 114/140 |
| 5,162,092 A * | 11/1992 | Klobucar | B29C 45/14778 264/243 |
| 5,232,654 A * | 8/1993 | Aida | B29C 45/1704 264/572 |
| 5,830,025 A | 11/1998 | Fleming | |
| 5,993,719 A * | 11/1999 | Abe | B29C 45/14467 264/257 |
| 2003/0116262 A1 | 6/2003 | Stiesdal et al. | |
| 2004/0224139 A1 | 11/2004 | Backhouse | |
| 2009/0148700 A1 * | 6/2009 | Cavaliere | B29C 70/08 428/376 |
| 2012/0034833 A1 | 2/2012 | Schaube et al. | |
| 2013/0244514 A1 * | 9/2013 | Scott | B63B 35/7926 441/79 |
| 2013/0309396 A1 * | 11/2013 | Legare | H01B 13/22 427/121 |
| 2015/0225044 A1 | 8/2015 | Longo et al. | |

FOREIGN PATENT DOCUMENTS

| | | |
|---|---|---|
| EP | 0172050 A1 | 2/1986 |
| FR | 2892998 | 5/2007 |
| JP | 03176292 | 7/1991 |
| WO | 2013177612 | 12/2013 |
| WO | WO-2013-177612 A1 * | 12/2013 |

OTHER PUBLICATIONS

Thomas, Shane, PCT Notification of Transmittal of the International Search Report and the Written Opinion of the International Searching Authority, of the Declaration, dated Apr. 29, 2015, pp. 1-11.

Japense Patent Office, Notification of Reasons for Rejection, dated Nov. 27, 2018, 4 pages, Japan.

* cited by examiner

METHOD OF MAKING SURF FIN INCLUDING INJECTION MOLDED PRE-IMPREGNATED COMPOSITE FIBER MATRIX INSERTS

CROSS-REFERENCE TO RELATED APPLICATIONS

The present application is a divisional patent application of and claims priority to U.S. patent application Ser. No. 14/175,949, filed on Feb. 7, 2014, the entire contents of which are incorporated herein by reference.

STATEMENT RE: FEDERALLY SPONSORED RESEARCH/DEVELOPMENT

Not Applicable

BACKGROUND

Technical Field of the Invention

The present invention relates generally to a surfboard fin, and more specifically to a fin having one or more pre-loaded, pre-impregnated insert sheets embedded within an injection molded resin material for enhancing the overall flex characteristics of the fin.

Description of the Related Art

It is well-known that surfboards are commonly outfitted with one or more fins attached to the underside of the board. The fin(s) extend into the water and generally serve as hydrofoils to provide a degree of stabilization and directional control of the board. In particular, a surfer may control direction of the board by varying his side-to-side weight distribution, which causes the fin to steer the board in the desired direction.

The amount of control desired by an individual surfer may be dependent upon the surfer's ability and surfing style. In particular, more novice surfers may not require a great deal of maneuverability with their board, as they tend to be more concerned with developing the basic techniques of paddling into a wave and transitioning to an upright stance. As the surfer improves his technique, the surfer may develop more advanced and aggressive styles of surfing, which typically includes several high speed twists, turns, and possibly jumps, where portions of the surfboard may leave the water. In view of the different styles of surfing, there are several different fins available, wherein the fins are generally suited for a particular surfing style or ability level.

For instance, the more advanced maneuvers noted above generally impart high forces on the fin. The fin's ability to return to its normal state after having the force applied effects the performance of the fin and the surfboard as a whole. A fin's responsiveness to the forces applied thereto may be largely attributable to the construction of the fin. Along these lines, many conventional fins for surfboards are formed from composite structures having layers of woven sheets embedded in a resin material. Such composite fins may be formed by conventional composite lay-up manufacturing techniques, wherein the resin material is introduced over layers of fiberglass fabric.

Although such lay-up manufacturing techniques have been regularly used for forming conventional surf fins, the lay-up process, and fins resulting therefrom tend to suffer from several deficiencies. One particular deficiency is that conventional lay-up manufacturing techniques tend to be slow, and therefore, inefficient. The time-consuming nature of conventional lay-up manufacturing is generally attributable to the introduction and flow of the resin material over the fabric lay-up.

Another deficiency associated with conventional fin lay-up manufacturing techniques relates to inherent design limitations. In particular, most lay-up manufacturing techniques require that the woven sheets are stacked on top of each other while the resin flows through the lay-up. Thus, more exotic configurations of the woven sheets wherein the woven sheets are spaced apart from each other are difficult, if not impossible to attain using conventional lay-up manufacturing techniques.

Therefore, there is a need in the art for an improved fin for a surfboard in comparison to the prior art. Various aspects of the present invention address these particular needs, as will be discussed in more detail below.

BRIEF SUMMARY

There is provided an injection molded surf fin having at least one structural pre-impregnated (i.e., "pre-preg") insert sheet encapsulated within an injectable resin material. The pre-preg insert sheet is placed within a mold and the injectable resin material is injected into the mold under pressure, which causes the pre-preg insert sheet to be stretched and loaded in tension. As the injected resin material cools, the pre-preg insert sheet is locked in the stretched configuration, which enhances the overall performance and responsiveness of the fin to external forces. The injection molded process of manufacturing the fin allows for quicker formation times, as well as new and unique placement of the pre-preg insert sheets within the fin, including insert sheets positioned in spaced relation to each other adjacent opposing side faces of the fin.

According to one embodiment, there is provided a fin for a water sports board. The fin includes a leading edge and a trailing edge. A base is attachable to the water sports board and extends between the leading edge and the trailing edge along a longitudinal base axis. A fin axis extends generally perpendicular to the longitudinal base axis, with the longitudinal base axis and fin axis residing within a shared longitudinal plane or respective longitudinal planes. The fin further includes a first side face and a generally opposing second side face. The first side face and the second side face are formed on generally opposed sides of the longitudinal plane. A first insert pre-preg sheet is disposed adjacent the first side face, and includes a plurality of first structural strands bonded by a first resin material. A second insert pre-preg sheet is disposed adjacent the second side face, and includes a plurality of second structural strands bonded by a second resin material. The first insert pre-preg sheet and the second insert pre-preg sheet are disposed on generally opposed sides of the longitudinal plane. An injection molded third resin material is disposed between the first insert pre-preg sheet and the second insert pre-preg sheet and around the first insert pre-preg sheet and the second insert pre-preg sheet to form at least a portion of the first side face and the second side face.

The first and second insert pre-preg sheets may be pre-loaded by increasing the tension within the sheets relative to a natural state. The second insert pre-preg sheet may be completely spaced from the first insert pre-preg sheet.

The plurality of first structural strands and the plurality of second structural strands may be of at least one structural property greater than the injection molded third resin material, wherein the at least one structural property is selected from the group consisting of: toughness, tensile strength, elastic modulus and Young's modulus. The plurality of first structural strands may be angularly offset from the plurality of second structural strands. The plurality of first structural strands may also differ from the plurality of second structural strands.

The first resin material in the first insert pre-preg sheet may differ from the second resin material in the second insert pre-preg sheet.

A core may be positioned between the first insert pre-preg sheet and the second insert pre-preg sheet and within the injection molded third resin material. The core may be spaced from the first insert pre-preg sheet and the second insert pre-preg sheet by the injection molded third resin material, and may be formed from a core substance that is of a density less than the injection molded third resin material. The core may be formed from an injectable foam material. The core may include a gaseous substance.

According to another embodiment, there is provided a method of forming a fin configured for use with a water sports board. The method includes the steps of providing: a mold having a mold cavity at least partially defined by a pair of opposed mold cavity faces, a first insert pre-preg sheet including a plurality of first structural strands bonded by a first resin material, and a second insert pre-preg sheet including a plurality of second structural strands bonded by a second resin material. The method further includes placing the first insert pre-preg sheet and the second insert pre-preg sheet within the mold cavity, and injecting a third resin material under pressure into the mold cavity between the first insert pre-preg sheet and the second insert pre-preg sheet. The injecting step urges the first insert pre-preg sheet and the second insert pre-preg sheet away from each other and towards respective ones of the pair of mold cavity faces, stretches the first insert pre-preg sheet and the second insert pre-preg sheet, disposes the third resin material between the first insert pre-preg sheet and the second insert pre-preg sheet to space at least a portion of the first insert pre-preg sheet from the second insert pre-preg sheet, and disposes the third resin material around the first insert pre-preg sheet and the second insert pre-preg sheet to form an outer surface of the fin.

The method may additionally include the step of injecting a core substance within the mold cavity to form a core within the third resin material between the first insert pre-preg sheet and the second insert pre-preg sheet. The step of injecting a core substance may include injecting a foam material into the third resin material or a gaseous material into the third resin material.

The method may further include the step of heating the first insert pre-preg sheet and the second insert pre-preg sheet prior to the injecting step.

The injecting step may cause portions of the first insert pre-preg sheet and the second insert pre-preg sheet to melt.

The method may additionally include the step of cooling the injected third resin material to harden the third resin material around the first insert pre-preg sheet and the second insert pre-preg sheet while the first insert pre-preg sheet and second insert pre-preg sheet are stretched. The step of cooling the injected third resin material may cause the third resin material to contract.

The placing step may include placing the first insert pre-preg sheet and the second insert pre-preg sheet in the mold cavity in a position wherein the plurality of first structural strands are angularly offset from the plurality of second structural strands.

According to another aspect of the invention, there is provided a water sports board including a board body and a pair of fins attached to the board body in spaced relation to each other. The pair of fins include a first fin defining first flex characteristics associated with the resistance of the first fin to an external force applied to the first fin, and a second fin defining second flex characteristics associated with the resistance of the second fin to an external force applied to the second fin, the first flex characteristics being different from the second flex characteristics.

The difference between the first and second flex characteristics may be associated with the respective first and second insert pre-preg sheets included in the first and second fins.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and detailed description to indicate like elements.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
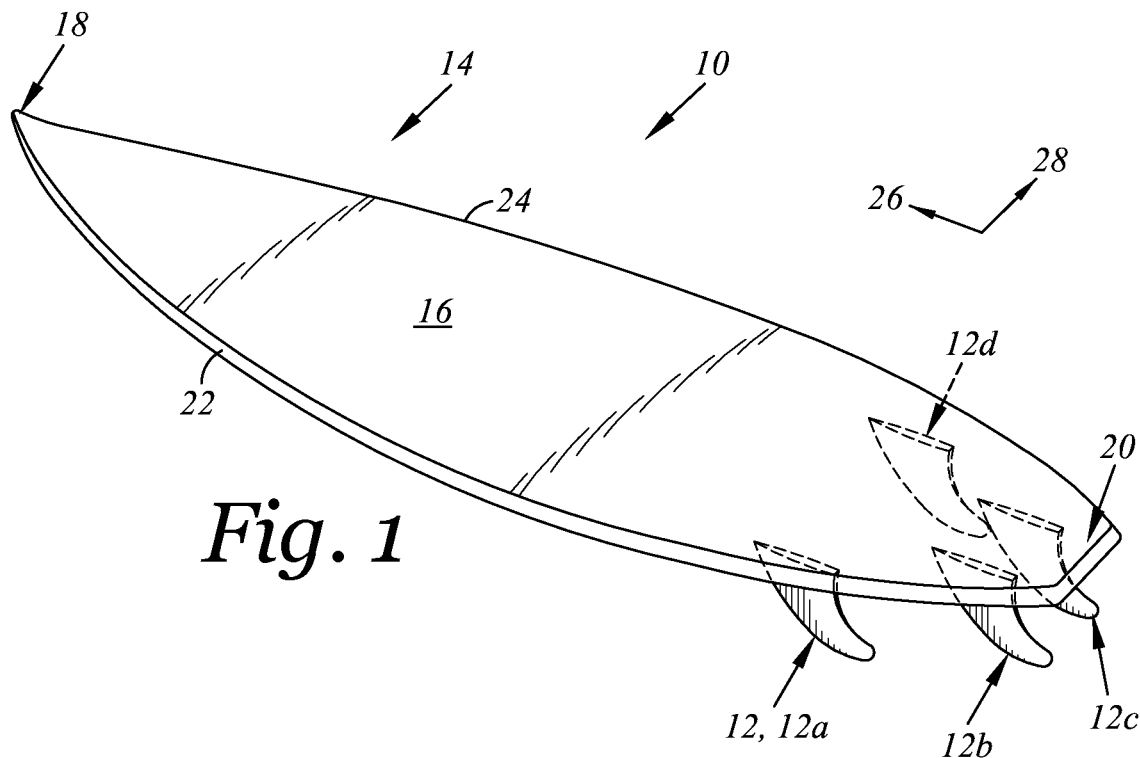
FIGS. 1 and 1A are upper perspective views of surfboards having a plurality of fins constructed in accordance with an embodiment of the present invention.

Referring now to the drawings, wherein the showings are for purposes of illustrating a preferred embodiment of the present invention only, and are not for purposes of limiting the same, FIG. 1 shows a surfboard 10 having a plurality of fins 12 constructed in accordance with an aspect of the present invention. As will be described in more detail, the fins 12 are constructed to exhibit prescribed flex characteristics to enhance the overall performance of the surfboard 10. The prescribed flex characteristics are attributable, at least in part, to at least one, and preferably two, inserts encapsulated within the fin 12, wherein the inserts are pre-loaded during the fabrication of the fin 12.

As used herein, the term "flex characteristics" refers to the fin's ability to resist or respond to an external force applied to the fin 12. For instance, a given fin's flex characteristics relate to the fin's resistance to bending, deflecting or twisting in several different directions, as well as the fin's ability to recoil from a flexed position to a natural/non-flexed condition.

The surfboard 10 includes a board body 14 having a deck 16 upon which a surfer stands while surfing on the surfboard 10. The board body 14 further includes a nose 18 and a tail 20 and a pair of opposed rails 22, 24 extending between the nose 18 and the tail 20. The board body 14 also defines a longitudinal board axis 26 and a transverse board axis 28 generally orthogonal to the longitudinal board axis 26.

Figure 1A:
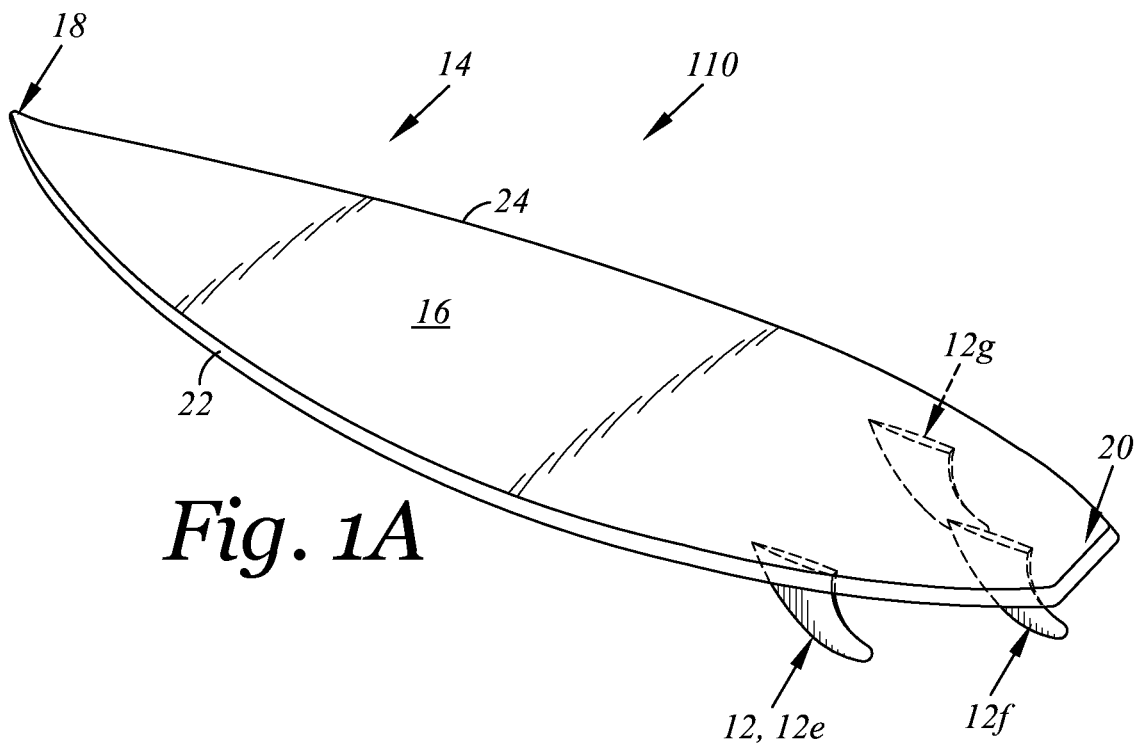
Figure 2:
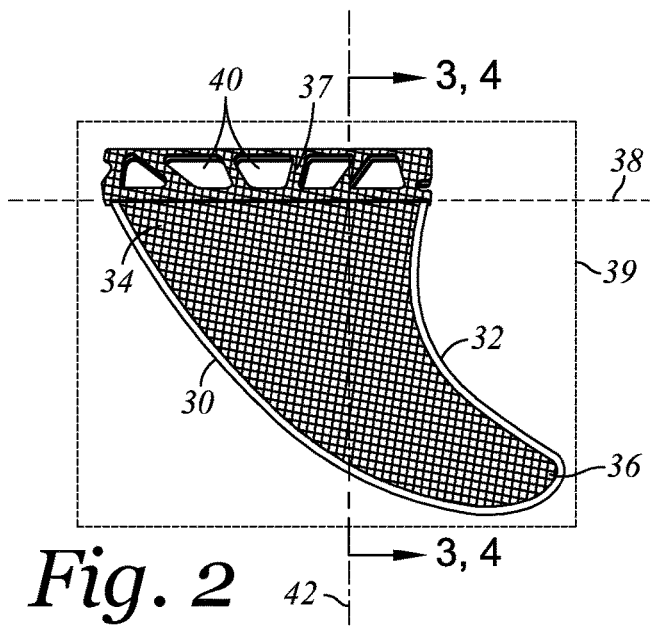
FIG. 2 is a side view of a fin constructed in accordance with an embodiment of the present invention.

FIG. 1A is another embodiment of a surfboard 110, with the primary difference between the surfboard 10 in FIG. 1 and the surfboard 110 in FIG. 2 relating to the number of fins 12 attached to the board body 14. In this regard, it is understood that the number of fins 12 included in the surfboard may vary without departing from the spirit and scope of the present invention. Along these lines, a surfboard may include as little as one fin 12 or may include more than four fins 12. As such, the construction of the fin 12 may be dependent upon the total number of fins 12 included in the surfboard, as will be described in more detail below.

Referring now to FIG. 2, there is shown a side view of a fin 12 constructed in accordance with an embodiment of the present invention. The fin 12 includes a leading edge 30 and a trailing edge 32, each of which extend between a base 34 and an opposing distal tip portion 36, with the leading and trailing edges 30, 32 converging in a direction from the base 34 to the distal tip portion 36. The base 34 extends between the leading edge 30 and trailing edge 32 along a longitudinal base axis 38. A fin axis 42 extends generally orthogonal to the longitudinal base axis 38 and resides within an interior central plane 39, which extends from the base 34 and intersects both the leading and trailing edges 30, 32.

As used herein, the term "plane" is not limited to a flat, two-dimensional surface. Rather, the term "plane" is used broadly to encompass both flat surfaces, as well as surfaces having a degree of curvature (i.e., deviation from flatness). For instance, in one embodiment, the interior central plane 39 may be flat, wherein the interior central plane 39 divides the fin into symmetrical halves. Alternatively, it is contemplated that the fin 12 may define a more complex geometry (i.e., curved or offset sections), wherein the interior central plane 39 is of an arcuate or curved configuration as it extends through the fin 12 between the leading and trailing edges 30, 32.

The base 34 is also configured to be attachable to the surfboard 10. In the exemplary embodiment, the fin 12 includes a tang 37 having a plurality of openings 40 extending therethrough which creates a truss structure that removes weight from the tang 37 and also assists in securing the fin 12 during assembly thereof, as will be described in more detail below. The fin 12 may be attachable to a fin box (not shown) attached to the board body 14. The fin box may include one or more clips or other attachment mechanisms for securing the tang 37 therein. For a more detailed discussion of a fin box, please refer to U.S. Pat. No. 5,830,025, entitled Fin Box for a Water Sports Board and Method of Installation, the contents of which are expressly incorporated herein by reference.

Figure 3:
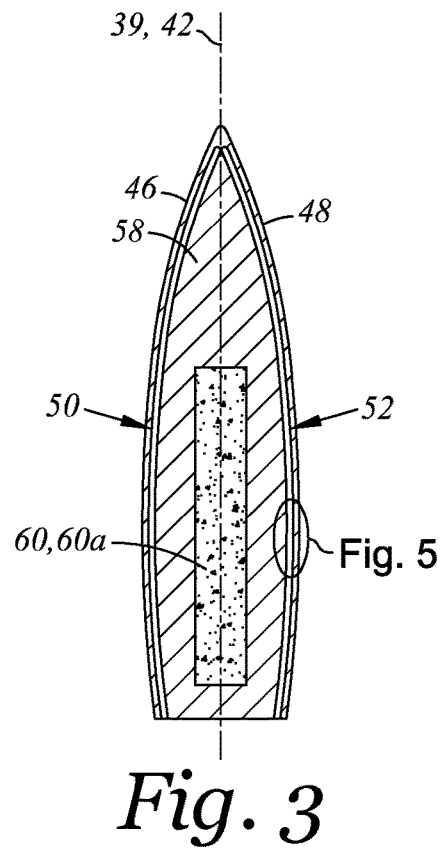
FIG. 3 is one embodiment of a sectional end view of the fin depicted in FIG. 2.
Figure 4:
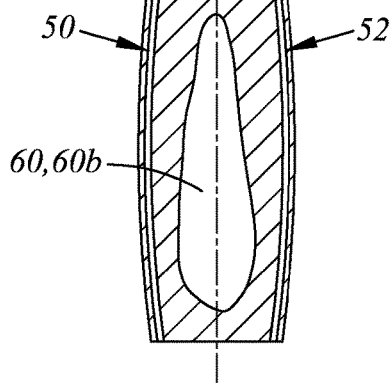
FIG. 4 is a second embodiment of a sectional end view of the fin depicted in FIG. 2.

Referring now to FIGS. 3 and 4, there is shown a cross-sectional view of the fin 12. As will be described in more detail below, the primary distinction between the fins 12 shown in FIGS. 3 and 4 relates to the different configurations of the internal core. The cross-section shown in FIGS. 3 and 4 is taken within a transverse cross sectional plane, which is orthogonal to the interior central plane 39. The fin axis 42 is shown as extending in a vertical direction and dividing the cross section into equal, symmetrical halves; however, as noted above, other embodiments of the fin 12 are contemplated wherein the fin axis 42 does not divide the fin 12 into equal, symmetrical halves. For instance, it is contemplated that the fin axis 42 may be offset from the tang 37.

The fin 12 includes a first side face 46 and a generally opposing second side face 48. The first and second side faces 46, 48 are formed on generally opposed sides of the interior central plane 39 and extend in one direction between the leading edge 30 and the trailing edge 32, and in another direction between the base 34 and distal tip portion 36. In the exemplary embodiment, the first and second side faces 46, 48 define generally symmetrical convex configurations relative to the longitudinal plane 44; however, it is understood that the first and second side faces 46, 48 may define unique configurations to achieve desired fluid-dynamic effects. For instance, the fin 12 may be shaped similar to an air-foil to attain certain performance characteristics.

According to one embodiment, the fin 12 includes a first insert pre-preg sheet 50 disposed adjacent the first side face 46 and a second insert pre-preg sheet 52 is disposed on an opposed side of the longitudinal plane 44 adjacent the second side face 48. It should be noted that although the exemplary embodiment includes two pre-preg sheets 50, 52, other embodiments of the fin 12 may include only one pre-preg sheet or more than two pre-preg sheets. In this regard, the illustration and corresponding description of two pre-preg sheets is for purposes of illustration, and is not intended to limit the scope of the present application. Furthermore, the exemplary embodiment shows the first and second insert pre-preg sheets 50, 52 as being separate sheets (i.e., not one integral sheet). However, in other embodiments, a single, integral sheet may be folded to allow a first portion of the sheet to be disposed adjacent the first side face 46 and a second portion of the sheet to be disposed adjacent the second side face 48. In this regard, any number of pre-preg sheets may be used without departing from the spirit and scope of the present invention.

Figure 5:
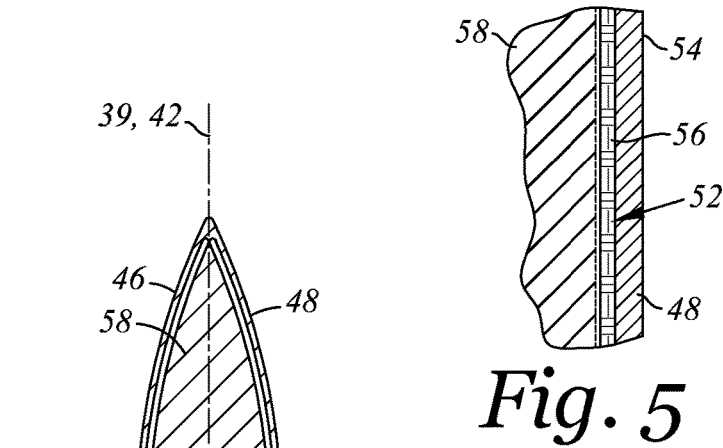
FIG. 5 is an enlarged sectional view of the lateral portion of the fin including an insert pre-preg sheet and injected resin material.

As used herein, the term "pre-preg sheet" refers to a pre-impregnated sheet of structural strands bonded by a resin material. In particular, the first insert pre-preg sheet 50 may include first structural strands bonded by a first resin material, while the second insert pre-preg sheet 52 may include second structural strands bonded by a second resin material. The first structural strands used in the first insert pre-preg sheet 50 may be the same or different from the second structural strands used in the second pre-preg sheet 52, and the first resin material used in the first insert pre-preg sheet 50 may be the same or different from the second resin material used in the second pre-preg sheet 52. The structural strands may include carbon fiber strands, Kevlar™ strands, or strands formed from other materials known in the art. The structural strands preferably exhibit high tensile strength and toughness. The structural strands located within a given pre-preg sheet may be woven together, or alternatively, arranged in a non-woven configuration. FIG. 5 is an enlarged partial sectional view showing the structural strands 54, 56 arranged in the second insert pre-preg sheet 52. As will be described in more detail below, the structural strands in the first and second pre-preg sheets 52 may be arranged in any desired orientation so as to control the flex characteristics of the fin 12.

An injection molded third resin material 58 is disposed between the first and second insert pre-preg sheets 50, 52, as well as around the first and second insert pre-preg sheets 50, 52 to form at least a portion of the first and second side faces 46, 48. In this regard, the injected resin material 58 may form the entirety of the first and/or second side faces 46, 48, or simply a small portion thereof, with the remaining portion of the side faces 46, 48 being formed by the respective first and second insert pre-preg sheets 50, 52. The third resin material 58 may be the same or different from the first and second resin materials used in the first and second insert pre-preg sheets 50, 52.

It is contemplated that various implementations of the fin 12 may include first and/or second side faces 46, 48 that are formed independent of the injection molded third resin material 58. In this respect, the pre-preg sheet(s) 50, 52 may form the entirety of the side faces 46, 48, or other materials known in the art may form the side faces 46, 48. The injected resin material 58 may be contained completely between the pre-preg sheets 50, 52. Furthermore, the pre-preg sheet(s) 50, 52 may be impermeable, which may not allow the injection molded resin material 58 to pass therethrough.

According to one embodiment, the fin 12 further includes an internal core 60 located between the first and second insert pre-preg sheets 50, 52 and within the injection molded resin material 58. The core 60 is spaced from the first and second insert pre-preg sheets 50, 52 by the injection molded third resin material 58, and is formed from a core substance that is of a density less than the injection molded resin material 58. For instance, the core substance may be an injectable foam material 60a, as shown in FIG. 3, or a gaseous substance 60b, such as nitrogen, as shown in FIG. 4. It is understood that the inclusion of a core 60 within the fin 12 is optional, and thus, other embodiments of the fin 12 may not include a core 60.

With the basic structural features of the fin 12 described above, reference is now made to FIGS. 6-16, which illustrate an exemplary embodiment of a method of forming the fin 12. Various aspects of the method are directed toward pre-loading the first and second inserts 50, 52 during the formation of the fin 12 to enhance the overall flex characteristics of the fin 12.

Figure 6:
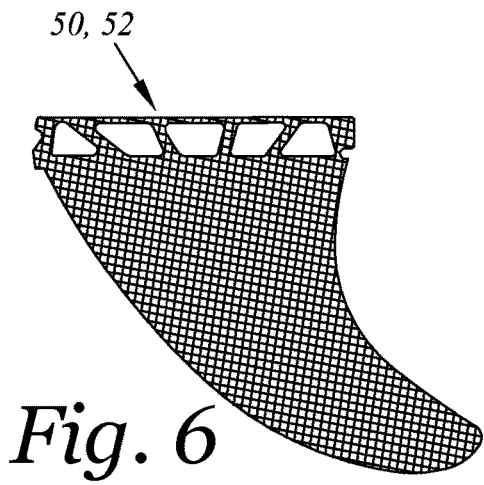
FIG. 6 is a side view of an embodiment of a first insert pre-preg sheet used in constructing the fin.
Figure 7:
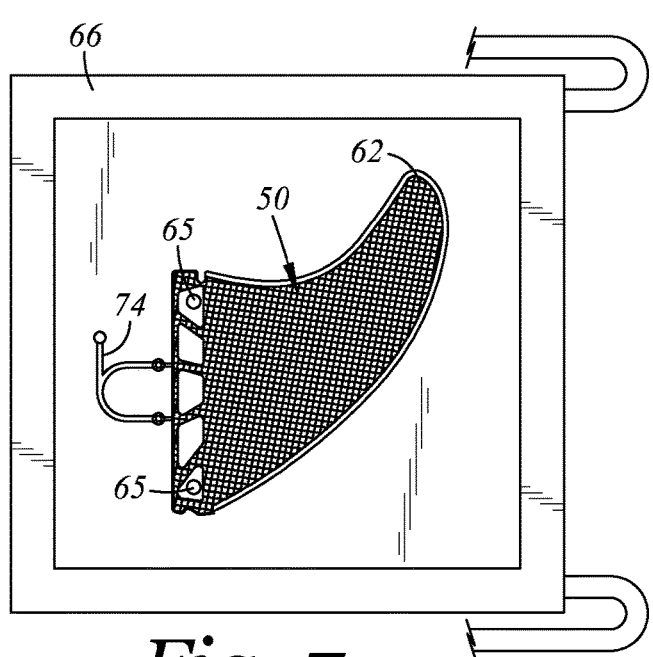
FIG. 7 is a top view of the first insert pre-preg sheet placed within a first mold housing.

Referring now specifically to FIG. 6 there is shown a pre-preg sheet configured for use as one of the first and second inserts 50, 52. In this regard, the pre-preg sheet has been cut, stamped or otherwise shaped in accordance with prescribed dimensional parameters. The exemplary pre-preg sheet shown in FIG. 6 defines a peripheral shape that is similar to, yet slightly smaller than, the peripheral shape of the fin 12. It is also contemplated that the pre-preg sheet(s) may actually have a peripheral size that is slightly larger than the perimeter of the resultant fin 12. In this respect, the slightly larger periphery may be attributable to a fin curvature. The first and second insert pre-preg sheets 50, 52 may define substantially identical configurations, or different configurations (i.e., one insert may be bigger than the other insert), depending on the particular flex characteristics that are desired.

Referring now to FIGS. 7-10, the pre-preg sheet 50, 52 is placed within a mold cavity 62 defined by a mold assembly 64 including a first mold housing 66 and a complimentary second mold housing 68. The mold cavity 62 defines a shape complimentary to the desired shape of the fin 12 and is collectively defined by the first and second mold housings 66, 68 when the mold housings 66, 68 are connected to each other. More specifically, the first mold housing 66 includes a first mold cavity face 70, while the second mold housing 68 defines a second mold cavity face 72. According to one embodiment, one or more tabs 65 extend into the mold cavity 62 from the respective mold cavity faces 70, 72 to restrain movement of the first and second insert pre-preg sheets 50, 52 during the injection process. It is also contemplated that as an alternative, the mold assembly 64 may be formed without tabs 65 and the pre-preg sheets 50, 52 may extend outside of the mold cavity 62 such that the pre-preg sheets 50, 52 are clamped in position between opposed surfaces of the respective mold housings 66, 68. The first and second mold housings 66, 68 are configured to be engageable with each other with the first and second mold cavity faces 70, 72 facing each other to define the mold cavity 62 therebetween. The mold assembly 64 includes an injection conduit 74 for delivering the injectable resin into the mold cavity 62, as well as the core substance for fins 12 including an internal core 60.

Figure 9:
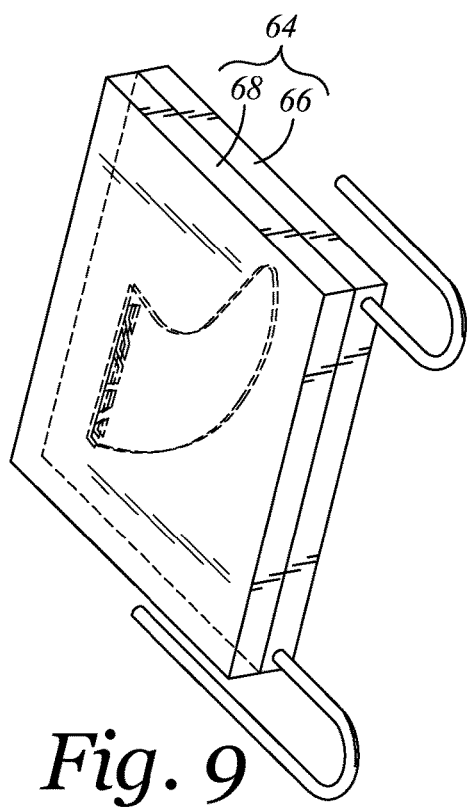
FIG. 9 is a perspective view of the mold assembly in a closed configuration.
Figure 8:
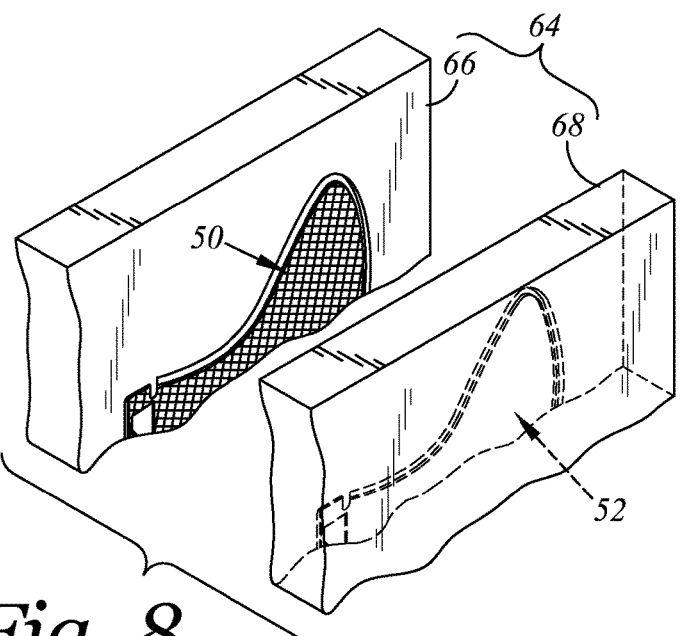
FIG. 8 is a partial exploded perspective view of a mold assembly including the first mold housing and a complimentary second mold housing.
Figure 10:
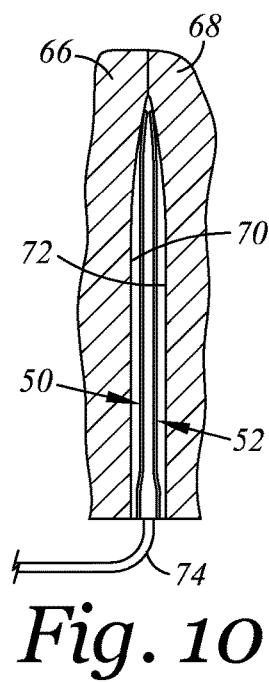
FIG. 10 is a partial sectional view of the mold assembly having first and second insert pre-preg sheets disposed within a mold cavity prior to injecting.

The first and second insert pre-preg sheets 50, 52 are placed within the first and second mold housings 66, 68, as shown in FIG. 8, and then the mold housings 66, 68 are closed, as shown in FIG. 9. FIG. 10 is a partial sectional view of the closed mold housings 66, 68, with the first and second insert pre-preg sheets 50, 52 placed within the mold cavity 62 prior to injection of the injectable resin material 58 into the mold cavity 62. The injection conduit 74 is preferably positioned between the first and second pre-preg sheets 50, 52 such that injection of the resin material 58 into the mold 64 causes the pre-preg sheets 50, 52 to move in opposite directions toward the respective mold cavity faces 70, 72, as will be described in more detail below.

According to one embodiment, the pre-preg insert sheets 50, 52 are heated prior to the mold assembly 64 being closed, which may enhance the bonding between the pre-preg insert sheets 50, 52 and the injected resin material 58. For instance, the heating of the sheets 50, 52 may allow the resin materials within the sheets 50, 52 to melt (or approach their respective melting points), which enables enhanced bonding/melding between the resins in the sheets 50, 52 and the injected resin material 58. The heating of the sheets 50, 52 may also improve the flexibility of the sheets 50, 52 to allow the sheets 50, 52 to conform to the shape of the mold during the injection process. It is understood that the heating of the pre-preg insert sheets 50, 52 is optional, and thus, other embodiments of the method may proceed without heating the pre-preg sheets 50, 52 before the mold assembly 64 closes.

Figure 11:
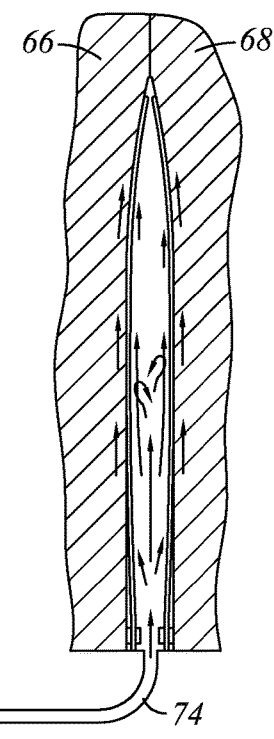
FIG. 11 is a partial sectional view of the mold assembly and an injectable resin material injected into the mold cavity under pressure between the first and second insert pre-preg sheets.

Referring now to FIG. 11, when the first and second insert pre-preg sheets 50, 52 are placed in the mold cavity 62 and the mold housings 66, 68 are closed, the injectable resin material 58 may be injected into the mold cavity 62. The injected resin material 58 is preferably injected into the mold cavity 62 quickly and under pressure to create a "violent" event for pre-loading the pre-preg sheets 50, 52 and for pushing the sheets 50, 52 away from each other. The tabs 65 prevent the pre-preg sheets 50, 52 from sliding upwardly (i.e., in the direction of injection). When comparing the position of the sheets 50, 52 in FIG. 10 (i.e., pre-injection) to the position of the sheets 50, 52 in FIG. 11 (i.e., after commencement of injection), it can be seen that the sheets 50, 52 are spaced farther apart in FIG. 11, particularly adjacent the lower portion of the mold, which corresponds to the base portion of the fin 12.

As the injection molded resin material 58 is injected into the cavity 62, the injected resin material 58 fills the cavity 62 and is disposed between the first and second insert pre-preg sheets 50, 52, as well as around the pre-preg sheets 50, 52 to form an outer surface of the fin 12. According to one implementation, the sheets 50, 52 are porous to allow the injected resin material 58 to flow through the sheets 50, 52, while in other embodiments, the sheets 50, 52 are substantially non-porous, and thus, the injected resin material flows around the sheets 50, 52.

Figure 12:
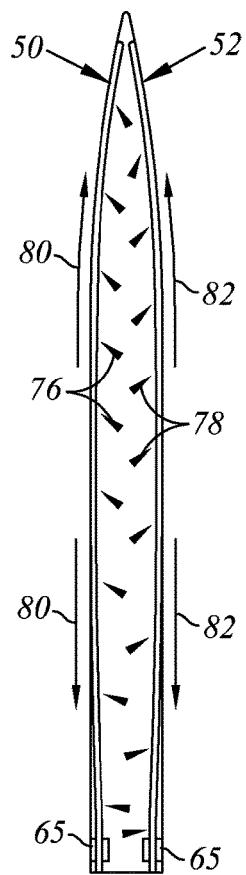
FIG. 12 is a schematic view of the pre-loading imparted on the first and second insert pre-preg sheets by the pressurized injected resin material.

FIG. 12 is a schematic representation of the loading applied to the sheets 50, 52 during the injection of the resin material 58. As the resin material 58 is injected between the sheets 50, 52, the pressure and flow of the resin material 58 urges the sheets 50, 52 in opposing directions. Internal arrows 76 represent a force applied to the sheet 50 in a first direction, while internal arrows 78 represent a force applied to the sheet 52 in a second direction, generally opposite to the first direction. In this regard, the pre-preg sheets 50, 52 are compressed forcefully against the corresponding walls 70, 72 of the mold 64. Surface friction and the pressure of the injected resin material 58 cause the sheets 50, 52 to stretch, which is represented by longitudinal arrows 80 in connection with the first sheet 50, and longitudinal arrows 82 in connection with the second sheet 52. The pressure of the injection works the pre-preg sheets 50, 52 to the walls 70, 72 of the mold initially adjacent the base 34 of the fin 12 and then stretches upwardly toward the distal tip portion 36 of the fin 12. When the sheets 50, 52 are "stretched," the sheets 50, 52 are loaded in tension, which may enhance the flex characteristics of the fin 12. It is contemplated that injection of the resin material 58 may cause the sheets 50, 52 to bend or change shape from a natural state, which in turn, stretches the sheets 50, 52 and increases the tension within the sheets 50, 52. In this respect, prior to the injection, when the sheets are in their respective "natural states," the sheets 50, 52 may be generally planar (e.g., unbent or flat) and may be under little or no tension.

According to one embodiment, after a large portion of the cavity 62 has been filled with the resin material 58, the injection of the resin material 58 may be halted and the core substance 60 may be injected into the cavity 62 between the pre-preg sheets 50, 52. The same delivery tube 74 may be used to deliver the resin material 58 and the core substance 60. As noted above, the core substance 60 may include an injectable foam, plastic or other solid materials, as well as a fluid, including gaseous substances or liquids. In the case of gaseous substances, the core substance may be of a pressure that is less than atmospheric pressure, equal to atmospheric pressure, or greater than atmospheric pressure. The injected core substance 60 may enhance the buoyancy, flex, or desired weight parameters of the fin 12. After a prescribed amount of the core substance 60 has been injected in the cavity 62, the injection of the resin material 58 may be resumed if there is remaining space to be filled in the cavity 62.

After the injected resin 58 fills the cavity 62, the mold is "packed" under extreme pressure to further stretch the pre-preg sheets 50, 52. At this point, the resin material impregnated on each pre-preg sheet 50, 52 is in a molten state. This allows the structural strands/fibers in the pre-preg sheets 50, 52 to be further stretched. As the temperature cools, the resin begins to harden and lock the stretched fibers into their stretched and pre-loaded state. The molten resin impregnated into the pre-preg sheets 50, 52 bonds with the injected molten resin 58 to create a stable, lasting bond.

Figure 13:
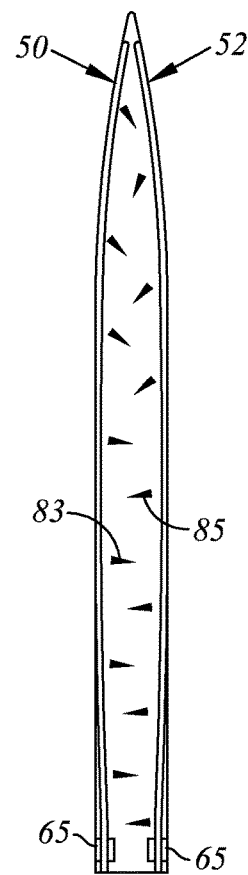
FIG. 13 is a schematic view illustrating contracting of the injected resin material which occurs when the injected resin material is cooled.
Figure 14:
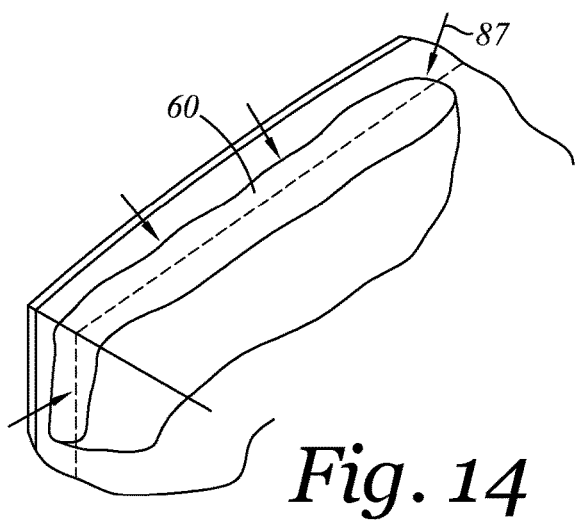
FIG. 14 is a partial upper perspective view of the fin.
Figure 15:
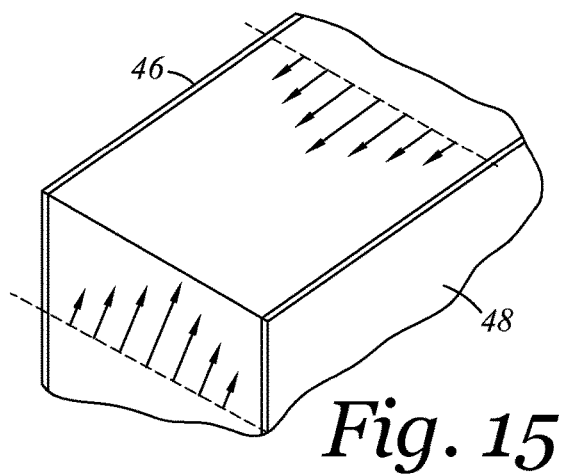
FIG. 15 is a schematic illustration of the pre-loaded stress profile for the fin depicted in FIG. 14.

Referring now to FIG. 13, there is shown a schematic view of the forces applied to the pre-preg sheets 50, 52, when the molten resin cools. In particular, the cooling process further stretches the portion of the pre-preg sheets 50, 52 that faces the outer surface of the fin 12. This results from the temperature of the mold being less than the temperature that liquefies the resin. The impregnated resin on the pre-preg sheets 50, 52 begins to cool first at the surface of the mold. As the rest of the material cools, it shrinks and pulls on the pre-preg sheet 50, 52 that is bonded to the surface in the direction of arrows 83, 85. This occurs because the inner portion of the injected resin cools last and the injected resin on the surface cools first. The greatest amount of shrinking/contraction occurs at the thickest areas of the fin 12. FIG. 14 is a partial perspective view of the fin 12 showing arrows 87, depicting the shrinking around the core 60.

As each side is pulled toward the other during the cooling process, the opposing forces create a dynamic, pre-loaded condition. This results in stored potential energy being locked into the fin 12, which increases resiliency. When the fin 12 is flexed, the fin 12 is more responsive because the materials are already stretched, dynamic and lively, and thus, the amount of deflection needed to reach elastic response is decreased. This, in turn, increases the performance of the fin 12.

Figure 16:
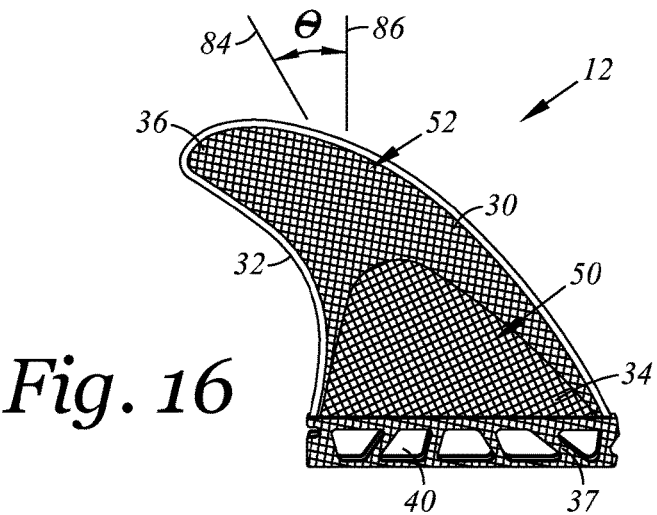
FIG. 16 is a side view of a fin having first and second insert pre-preg sheets including respective structural strands angularly offset from one another.

Referring now to FIG. 16, there is shown a side view of the fin 12 with a first insert pre-preg sheet 50 overlapping a second pre-preg insert sheet 52. The first insert pre-preg sheet 50 includes structural strands extending parallel to a first axis 84, as well as strands extending orthogonal to the first axis 84. The second insert pre-preg sheet 52 includes structural strands extending parallel to a second axis 86, as well as structural strands extending orthogonal to the second axis 86. When the first and second insert pre-preg sheets 50, 52 are loaded into the mold 64, the first and second insert pre-preg sheets 50, 52 may be arranged such that the first axis 84 is angularly offset relative to the second axis 86 by a prescribed angle, $\Theta$. In this regard, the first insert pre-preg sheet 50 includes structural strands that are angularly offset from structural strands in the second insert pre-preg sheet 52 by an amount, $\Theta$. The magnitude of the angle $\Theta$ may vary from fin to fin, depending on the desired performance parameters of the fin 12. In particular, the angle Θ may enhance the particular performance characteristics of the fin 12, such as flex properties, strength, etc.

Although the embodiment depicted in FIG. 16 shows the first and second insert pre-preg sheets 50, 52 defining corresponding axes 84, 86 that are angularly offset from one another, it is also contemplated that in other embodiments, the axes 84, 86 may be aligned with each other without departing from the spirit and scope of the present invention.

Specific performance parameters may also be achieved by forming the first and second insert pre-preg sheets 50, 52 to have specific shapes. For instance, in the fin 12 depicted in FIG. 16, the first insert pre-preg sheet 50 is smaller than the second insert pre-preg sheet 50, and extends within the portion of the fin 12 adjacent the base 34, but does not extend to the distal tip end portion 36 of the fin 12. In contrast, the second insert pre-preg sheet 52 is larger than the first insert pre-preg sheet 50, and extends substantially throughout the fin 12 from the base portion 34 to the distal tip end portion 36. As such, the first and second insert pre-preg sheets 50, 52 overlap adjacent the base portion 34 of the fin 12, and thus provide more strength and rigidity at the base portion 34, while the second insert pre-preg sheet 52 extends by itself at the distal tip end portion 36 of the fin 12. The degree of overlap between the first and second insert pre-preg sheets 50, 52 and the specific peripheral shape defined by the pre-preg sheets 50, 52 may vary from fin to fin, depending on the specific performance parameters intended for the fin 12.

Figure 17:
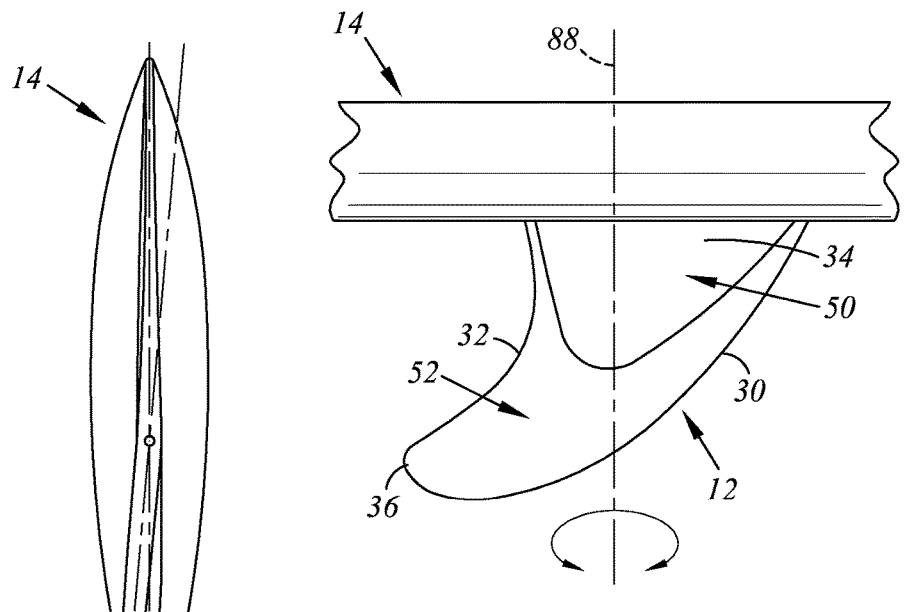
FIG. 17 is a partial side sectional view of the surfboard and a fin attached to the surfboard.
Figure 18:
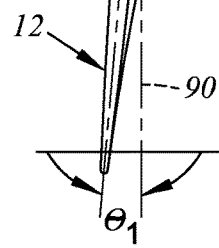
FIG. 18 is a bottom view of the fin depicted in FIG. 17, with the fin flexed in a first direction.
Figure 19:
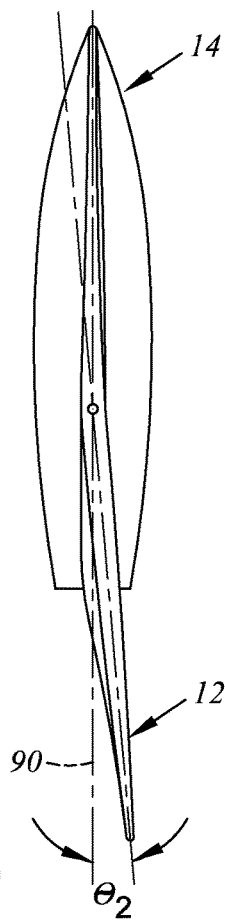
FIG. 19 is a bottom view of the fin depicted in FIG. 17, with the fin flexed in a second direction.

Referring now specifically to FIGS. 17-19, it is understood that when the fin 12 is attached to a board body 14, the fin 12 may flex, bend or twist in several different directions and about several different axes as forces are applied to the fin 12 as the fin 12 travels through water. FIG. 17 is a side view of the fin 12. In most cases, the fin 12 is rigidly attached to the board body 14, and thus, the base 34 of the fin 12 is anchored thereto such that there is little relative movement between the base 34 and the board body 14. However, when a torsional force is applied to the fin 12, the fin 12 will have a tendency to twist about a torsional axis 88. As discussed above, the fin's ability to resist such torsional forces will depend on the inserts used in the fin 12 (including the composition and shape of the inserts as well as the degree of overlap of the inserts), the composition of the injection molded material, and the magnitude of pre-loading/stretching of the inserts during the manufacturing of the fin 12. In some cases, it may be desirable to construct a more rigid fin 12 that is more resistant to torsional bending, while in other cases, it may be desirable to construct the fin 12 to allow for a greater degree of bending.

FIGS. 18 and 19 are bottom views of the fin 12 and show lateral bending of the fin 12 relative to the board body 14. A central reference axis 90 is shown and represents the axis defined by the fin 12 when the fin 12 is in a natural state (i.e., not flexed or bent). FIG. 18 shows the fin 12 bending in a first direction relative to the reference axis 90 by an amount ($\Phi_1$, while FIG. 19 shows the fin 12 being in an opposing second direction relative to the reference axis 90 by an amount $\Phi_2$. The amount $\Phi_1$ may be the same or different than $\Phi_2$ when the same force is applied to the fin 12. In other words, in some cases, it may be desirable to construct the fin 12 such that the resistance to bending is the same in the first and second directions. However, in other instances, it may be desirable to construct the fin 12 to be more resistant to bending in one direction relative to an opposing direction, depending on the desired overall performance parameters of the board 10.

For instance, referring back to FIGS. 1 and 1A, the surfboards 10, 110 both include a plurality of fins 12 attached to the board body 14 adjacent the respective tail portions 20 thereof. In particular, surfboard 10 in FIG. 1 includes fins 12a, 12b, 12c, and 12d. Lateral fins 12a and 12d are positioned adjacent respective ones of the opposed rails 22, 24, while the medial fins 12b and 12c reside between the lateral fins 12a and 12d on opposed sides of the longitudinal centerline of the board 14. Since each fin 12 is positioned at a unique location along the board 14, each fin 12 will have different forces applied thereto. As such, each fin 12 may be specifically fabricated to have a unique flex characteristics. For example, the lateral fins 12a, 12d may be more resistant to bending laterally outward, while being more forgiving laterally inward (or vice versa), while the medial fins 12b, 12c may be configured to be equally resistant to bending in all directions. Of course, the lateral fins 12a, 12d are not required to have similar flex characteristics, i.e., one lateral fin may be more rigid, while the remaining lateral fin is more flexible. Similarly, the medial fins 12b, 12c may also have different or unique flex characteristics relative to each other. In this regard, the grouping of the fins 12a-d into "lateral" or "medial" is simply for purposes of easily identifying the fins, and does not have a limiting effect. As such, each fin 12 may possess its own unique and distinct flex characteristics relative to the remaining fins 12 on the board 14.

Although the foregoing describes the use of the fin 12 on a surfboard, it is understood that the fin 12 may be used on a variety of water sports boards, including but not limited to, stand up paddle boards, water skis, wake boards, paddle boards, wind surf boards, or other boards and personal watercraft known in the art or developed in the future.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a fin configured for use with a water sports board, the method comprising the steps of:
   providing:
   a mold having a mold cavity at least partially defined by a pair of opposed mold cavity faces;
   a first insert pre-preg sheet including a plurality of first structural strands bonded by a first resin material; and
   a second insert pre-preg sheet including a plurality of second structural strands bonded by a second resin material;
   placing the first insert pre-preg sheet and the second insert pre-preg sheet within the mold cavity;
   injecting a third resin material under pressure into the mold cavity between the first insert pre-preg sheet and the second insert pre-preg sheet to:
   urge the first insert pre-preg sheet and the second insert pre-preg sheet away from each other and towards respective ones of the pair of mold cavity faces; and
   dispose the third resin material between the first insert pre-preg sheet and the second insert pre-preg sheet to space at least a portion of the first insert pre-preg sheet from the second insert pre-preg sheet; and injecting a core substance only in the form of a gaseous material into the third resin material to form a unitary hollow volume completely enclosed within the third resin material.

2. The method recited in claim 1 wherein the core substance is nitrogen.

3. The method of claim 2, wherein the core substance has a pressure less than atmospheric pressure.

4. The method of claim 1, further comprising the step of heating the first insert pre-preg sheet and the second insert pre-preg sheet prior to the injecting step.

5. The method of claim 1, further comprising the step of cooling the injected third resin material to harden the third resin material around the first insert pre-preg sheet and the second insert pre-preg sheet while the first insert pre-preg sheet and second insert pre-preg sheet are stretched.

6. The method of claim 5, wherein the step of cooling the injected third resin material causes the third resin material to contract.

\* \* \* \* \*